E. I. DODDS.
STAY BOLT.
APPLICATION FILED SEPT. 21, 1912.
1,077,054.
Patented Oct. 28, 1913.
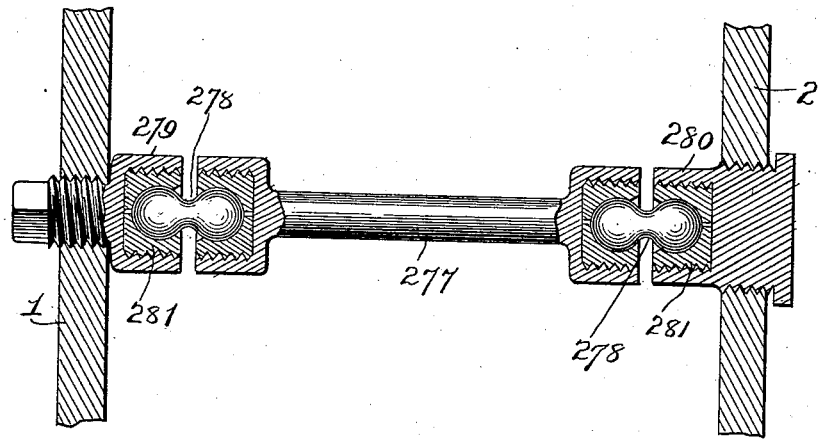
WITNESSES
INVENTOR
Attorney

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,054.     Specification of Letters Patent.     Patented Oct. 28, 1913.

Original application filed September 25, 1911, Serial No. 651,051. Divided and this application filed September 21, 1912. Serial No. 721,677.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, and permitting the sheets to expand and contract at will.

Another object of the invention is to provide a stay-bolt that can readily be applied from the inside without the trouble and expense of dismantling the engine, and can be adjusted at any time, if necessary.

The accompanying drawing is a view partly in longitudinal section and partly in elevation of a bolt embodying my invention.

1 represents the inside plate of a locomotive boiler, 2 the outside plate, and 279 and 280 are connectors secured to these respective plates. The connector 280 is of greater diameter than any of the other parts, so that these said parts may be introduced through the hole in wall or plate 2, that is closed when the parts are in place, by the connector, which latter is threaded externally to engage threads in the plate, and is provided at its outer end with a flange to limit its penetration. The inner end of this connector is recessed to receive the two part bushing 281, and the two parts of latter when assembled, form a cylindrical member threaded externally to engage internal threads in the connector 280. Each member of the two part bushing is provided with a hemi-spherical cavity to receive one head of the dumb bell shaped link 278. Connector 279 is like connector 280 except that it is provided with a reduced shank for engagement with the wall or plate 1 of the boiler, and it also carries a link 278.

The bolt shank 277 is enlarged and recessed at its opposite ends and carries bushings identical with bushings 281 in the connectors, which bushings are connected to the inner or adjacent ends of the links.

With this construction the bolt shank 277, is connected by a double ball and socket joint with each plate or wall of the boiler, and while it is free to give to accommodate itself to expansion and contraction of the boiler walls it will also prevent the collapsing of the walls.

Having fully described my invention what I claim as new and desire to secure by Letters-Patent, is:—

1. A stay bolt, a connector for the same, and a dumb bell-shaped link connecting one end of said stay bolt with said connector, whereby a universal joint is provided between the connector and the link and between the link and the bolt.

2. A stay bolt, connectors for the same and two dumb bell-shaped links each connecting one end of the stay bolt with a connector, whereby a universal joint is formed between the links and the connectors, and between the links and the bolt.

3. A stay bolt provided with recessed ends, a two part bushing in each recess, a dumb bell shaped link secured in each bushing and two connectors each having a loose connection with the free end of one of the links carried by the bolt shank.

In testimony whereof, I have signed this specification in the presence of two subscribing witnesses.

ETHAN I. DODDS.

Witnesses:
   A. W. BRIGHT,
   GEO. F. DOWNING.